(12) United States Patent
Han et al.

(10) Patent No.: US 8,775,144 B2
(45) Date of Patent: Jul. 8, 2014

(54) CONSTRAINED PRESSURE RESIDUAL PRECONDITIONER FOR EFFICIENT SOLUTION OF THE ADJOINT EQUATION

(75) Inventors: Choongyong Han, Houston, TX (US);
John Wallis, Sugar Land, TX (US);
Pallav Sarma, San Ramon, CA (US);
Gary Li, Katy, TX (US); Mark Schrader, The Woodlands, TX (US);
Wen Chen, Danville, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 203 days.

(21) Appl. No.: 13/323,060

(22) Filed: Dec. 12, 2011

(65) Prior Publication Data
US 2012/0150506 A1 Jun. 14, 2012

Related U.S. Application Data

(60) Provisional application No. 61/422,527, filed on Dec. 13, 2010.

(51) Int. Cl.
*G06G 7/48* (2006.01)
*G06F 17/12* (2006.01)

(52) U.S. Cl.
CPC ............................ *G06F 17/12* (2013.01)
USPC .............................................. 703/10

(58) Field of Classification Search
USPC .............................................. 703/10
See application file for complete search history.

(56) References Cited

U.S. PATENT DOCUMENTS

| 6,662,146 | B1 | 12/2003 | Watts |
| 7,516,056 | B2 | 4/2009 | Wallis et al. |
| 7,672,818 | B2 | 3/2010 | Watts |
| 2006/0235667 | A1 | 10/2006 | Fung et al. |
| 2006/0265204 | A1 | 11/2006 | Wallis et al. |

OTHER PUBLICATIONS

Coats et al.: A Generalized Wellbore and Surface Facility Model, Fully Coupled to a Reservoir Simulator; Apr. 2004 SPE Reservoir Evaluation & Engineering; 2004; pp. 132-142.*
Hui et al.; An Innovative Workflow to Model Fractures in a Giant Carbonate Reservoir; IPTC 12572; 2008 International Petroleum Technology Conference;, Kuala Lumpur, Malaysia. Dec. 2008; pp. 1-15.*
Han et al. Enhancement of the CPR Preconditioner for Efficient Solution of the Adjoint Equation (SPE 141300); SPE Reservoir simulation Symposium, Woodlands, Texas, 2011; pp. 1-11.*
Khait; Efficient Parallel Reservoir Simulation Using Multicore Architectures; SPE 119107; SPE Reservoir simulation Symposium, Woodlands, Texas, 2009; pp. 1-5.*

(Continued)

*Primary Examiner* — Hugh Jones
(74) *Attorney, Agent, or Firm* — Ana C. Jaquez

(57) ABSTRACT

A method, system and computer program product is disclosed for using a constrained pressure residual (CPR) preconditioner to solve adjoint models. A linear system of fluid flow equations comprising a plurality of variables that represent fluid flow properties in a geological formation of a subterranean reservoir is provided. Matrix $(\tilde{A})^T$, which comprises a transpose of a Jacobian matrix associated with the linear system of fluid flow equations, is constructed. A constrained pressure residual preconditioner $M_{CPRA}^{-1}$ is constructed responsive to the matrix $(\tilde{A})^T$. Matrix equation $(\tilde{A})^T y = d$ is then solved using the constrained pressure residual preconditioner $M_{CPRA}^{-1}$.

15 Claims, 12 Drawing Sheets

(56) References Cited

OTHER PUBLICATIONS

Cao et al.: Parallel Scalable Unstructured CPR-Type Linear Solver for Reservoir simulation; SPE 96809; 2005 SPE Annual Technical Conference and Exhibition; Dallas, Texas; 2005; pp. 1-8.*
Al-Shaalan et al.; Studies of Robust Two Stage Preconditioners for the Solution of Fully Implicit Multiphase Flow Problems; SPE 118722; SPE Reservoir simulation Symposium, Woodlands, Texas, 2009; pp. 1-12.*
Aziz, K. and Settari, A., *Petroleum Reservoir Simulation*, Applied Science Publishers Ltd., 1979, 58 pages.
Chen, Y., Oliver, D.S., and Zhang, D., *Efficient Ensemble-based Closed-loop Production Optimization*, SPE Journal, 14(4), 634-645, 2009.
Coates, K.H., *A Note on IMPES and Some IMPES-Based Simulation Models*, SPE 65092-PA, SPE Journal 5 (3), Sep. 2000, 7 pages.
Coates, K.H., *IMPES Stability: Selection of Stable Timesteps*, SPE 84924-PA, SPE Journal, Jun. 2003, 7 pages.
Cuthill, E., *Several Strategies for Reducing the Bandwidth of Matrices*, Sparse Matrices and their Applications, D.J. Rose and R.A. Willoughby, eds., Plenum Press, New York, 1972, pp. 157-166.
George, J.A., *A Survey of Sparse Matrix Methods in the Direct Solution of Finite Element Equations*, Proc. Summer Computer Simulation Conf., Montreal, Canada, Jul. 17-19, 1973, pp. 15-20.
Peaceman, D., *Fundamentals of Numerical Reservoir Simulation*, Elsevier Scientific Publishing Company, 1977, 39 pages.
Saad, Y. and Schultz, M.H., *GMRES: A Generalized Minimal Residual Algorithm for Solving Nonsymmetric Linear Systems*, SIAM J. Sci. Stat. Comput, 7:856-869, 1986.
Saad, Y., *Multilevel ILU With Reorderings for Diagonal Dominance*, SIAM J. Sci. Comput., 27:1032-1057, 2006.
Saad, Y., *ILUT: A Dual Threshold Incomplete ILU Factorization*, Numerical Linear Algebra with Applications, vol. 1, No. 4, pp. 387-402,1994.
Stone, H.L., Garder, Jr., A.O., *Analysis of Gas-Cap or Dissolved-Gas Drive Reservoirs*, SPE 1518-G, Society of Petroleum Engineers Journal, Jun. 1961, 13 pages.
Thomas, G.W., Thurnau, D.H., *Reservoir Simulation Using an Adaptive Implicit Method*, SPE 10120, Society of Petroleum Engineers of AIME, Oct. 1983, 10 pages.
Van Der Vorst, H., *Bi-CGSTAB: A Fast and Smoothly Converging Variant of Bi-CG for the Solution of Nonsymmetric Linear Systems*, SIAM J. Sci. Statist. Comput. 13:631-644, 1992.

Vinsome, P.K.W., *Orthomin, An Iterative Method for Solving Sparse Sets of Simultaneous Linear Equations*, in Proc. Fourth Symposium on Reservoir Simulation, Society of Petroleum Engineers of AIME, (1976), 149-159, SPE 5729-MS.
Watts-III, J.W., *A Conjugate Gradient Truncated Direct Method for the Iterative Solution of the Reservoir Pressure Equation*, SPE 8252-PA, Society of Petroleum Engineer Journal, 21:345-353, 1981.
Lous J. Durlofsky et al., Aug. 20, 2004, DE-AC26-99BC15213, Aug. 20, 2004, Advanced Techniques for Reservoir Simulation and Modeling of Nonconventional Wells. (See attached pp. 16-18.).
PCT Notification of Transmittal of the International Search Report and the Written Opinion of the International Searching Authority, or the Declaration regarding PCT/US2011/064341 dated May 29, 2012 (10 pgs).
Appleyard, J.R., et al.; "Nested Factorization"; SPE 12264, Nov. 1983, pp. 315-320 (with attached Tables).
Brouwer, D.R., et al.; "Dynamic Optimization of Water Flooding with Smart Wells Using Optimal Control Theory"; SPE 78278, Oct. 2002, pp. 1-14.
Cao, H., et al.; "Parallel Scalable Unstructured CPR-Type Linear Solver for Reservoir Simulation"; SPE 96809, Oct. 2005, pp. 1-8.
Chaudhri, Masroor M., et al.; "An Improved Approach for Ensemble Based Production Optimization: Application to a Field Case"; SPE 121307, Jun. 2009, pp. 1-14.
Knight, Philip A.; "The Sinkhorn-Knopp Algorithm: Convergence and Applications"; Aug. 2006, Dagstuhl Seminar Proceedings 07071, http://drops.dagstuhl.de/opus/volltexte/2007/1064, pp. 1-18.
Li, Na, et al.; "Crout Versions of ILU for General Sparse Matrices"; Apr. 7, 2002, pp. 1-17.
Ruiz, Daniel; "A Scaling Algorithm to Equilibrate Both Rows and Columns Norms in Matrices"; RAL-TR-2001-034, Sep. 10, 2001, pp. 1-19.
Sarma, P., et al.; "Implementation of Adjoint Solution for Optimal Control of Smart Wells"; SPE 92864, Jan.-Feb. 2005, pp. 1-17.
Sarma, P., et al.; "Production Optimization with Adjoint Models Under Nonlinear Control-State Path Inequality Constraints"; SPE 99959, Apr. 2006, pp. 1-19.
Wallis, J.R., et al.; "Constrained Residual Acceleration of Conjugate Residual Methods;" SPE 13536, Feb. 1985, pp. 415-426 (with attached Tables).
Wallis, J.R., et al.; "Incomplete Gaussian Elimination as a Preconditioning for Generalized Conjugate Gradient Acceleration"; SPE 12265, Nov. 1983, pp. 325-331 (with attached Tables).

* cited by examiner

CONSTRAINED PRESSURE RESIDUAL PRECONDITIONER FOR EFFICIENT SOLUTION OF THE ADJOINT EQUATION

CROSS-REFERENCE TO A RELATED APPLICATION

The present application for patent claims the benefit of U.S. Provisional Application bearing Ser. No. 61/422,527, filed on Dec. 13, 2010, which is incorporated by reference in its entirety.

TECHNICAL FIELD

This invention generally relates to a method, system and computer program product for using preconditioners to solve linear systems of equations, and more particularly, for using a constrained pressure residual (CPR) preconditioner to solve adjoint models.

BACKGROUND

Production optimization problems often involve large, highly complex reservoir models, thousands of unknowns and many nonlinear constraints, which makes the numerical calculation of gradients for the optimization process impractical. Adjoint models can be used for the calculation of gradients very efficiently. However, direct coding of the adjoint model is typically complex and time consuming, and the code is dependent on the forward model in the sense that it must be updated whenever the forward model is modified.

A recently developed adjoint construction procedure makes it relatively easy to construct the adjoint equation and has the additional advantage of making the adjoint simulation code independent of the forward simulation code. For a fully implicit forward model and specific forms of the cost function and nonlinear constraints, all information necessary for the adjoint run is calculated and stored during the forward simulation itself. The adjoint run then requires only the appropriate assembling of this information to calculate gradients of the cost function with respect to control variables at each control step. During the assembling procedure, the adjoint equation at each timestep is solved for Lagrange multipliers using information obtained from forward simulation such as Jacobians.

As used herein, the adjoint equation is a linear equation formed with the transpose of the Jacobian matrix that is evaluated at convergence for each timestep, such as from a fully implicit reservoir simulator. Conventional preconditioners (e.g., Constrained Pressure Residual (CPR) preconditioner, nested factorization method) typically cannot be directly applied to the adjoint equation, especially when dealing with large and/or complex reservoir models. In particular, conventional preconditioners exploit properties of the Jacobian matrix in order to accelerate convergence during reservoir simulation and therefore, often prove impractical and ineffective for solving the adjoint equation.

SUMMARY

A method is disclosed for solving adjoint models. The method comprises providing a linear system of fluid flow equations comprising a plurality of variables that represent fluid flow properties in a geological formation of a subterranean reservoir. A matrix $(\tilde{A})^T$ is constructed comprising a transpose of a Jacobian matrix. The transpose of the Jacobian matrix is associated with the linear system of fluid flow equations. A constrained pressure residual preconditioner $M_{CPRA}^{-1}$ is constructed responsive to the matrix $(\tilde{A})^T$. Matrix equation $(\tilde{A})^T y = d$ is solved using the constrained pressure residual preconditioner $M_{CPRA}^{-1}$.

A system is also disclosed for solving adjoint models. The system comprises a database, a computer processer, and a computer program. The database is configured to store data comprising a linear system of fluid flow equations comprising a plurality of variables that represent fluid flow properties in a geological formation of a subterranean reservoir. The computer program, which is executable on a computer processer, comprises a CPRA module. The CPRA module is configured to receive the linear system of fluid flow equations from the database and construct a matrix $(\tilde{A})^T$ comprising a transpose of a Jacobian matrix. The transpose of the Jacobian matrix is associated with the linear system of fluid flow equations. The CPRA module is further configured to construct a constrained pressure residual preconditioner $M_{CPRA}^{-1}$ responsive to the matrix $(\tilde{A})^T$. The constrained pressure residual preconditioner $M_{CPRA}^{-1}$ can be used for solving matrix equation $(\tilde{A})^T y = d$.

A computer program product is also disclosed for solving adjoint models. The computer program product comprises a non-transitory computer usable medium having a computer readable program code embodied therein. The computer readable program code comprises a CPRA module configured to construct a matrix $(\tilde{A})^T$ comprising a transpose of a Jacobian matrix. The transpose of the Jacobian matrix is associated with a linear system of fluid flow equations comprising a plurality of variables that represent fluid flow properties in a geological formation of a subterranean reservoir. The CPRA module is further configured to construct a constrained pressure residual preconditioner $M_{CPRA}^{-1}$ responsive to the matrix $(\tilde{A})^T$. The constrained pressure residual preconditioner $M_{CPRA}^{-1}$ can be used for solving matrix equation $(\tilde{A})^T y = d$.

In one or more embodiments of the present invention, the linear system of fluid flow equations are written in the form of matrix $\tilde{A}$ such that matrix $\tilde{A}$ corresponds to matrix equation $\tilde{A}x = \tilde{b}$ wherein solution vector x models fluid flow in the reservoir and vector $\tilde{b}$ represents of a right hand side vector of known values. The linear system of fluid flow equations can be provided at convergence for each timestep from a fully implicit reservoir simulator.

In one or more embodiments of the present invention, the constrained pressure residual preconditioner $M_{CPRA}^{-1}$ is a two-stage preconditioner. In one or more embodiments of the present invention, CPR preconditioner $M_{CPRA}^{-1}$ is constructed as $M_{CPRA}^{-1} = C(A_p^T)^{-1}C^T[I-(\tilde{A})^T(\hat{M})^{-1}]+(\hat{M})^{-1}$.

In one or more embodiments of the present invention, solving matrix equation $(\tilde{A})^T y = d$ using the constrained pressure residual preconditioner $M_{CPRA}^{-1}$ comprises applying factorization to matrix $(\tilde{A})^T$ to obtain a residual and using the residual to solve a transpose of a pressure matrix.

In one or more embodiments of the present invention, solving matrix equation $(\tilde{A})^T y = d$ using the constrained pressure residual preconditioner $M_{CPRA}^{-1}$ comprises solving $\hat{M}x_f = r$ for $x_f$ to obtain a residual, computing a modified residual according to $r_m = r - (\tilde{A})^T x_f$, computing a reduced residual according to $r_p = C^T r_m$, solving a transpose of a pressure matrix equation $(A_p)^T x_p = r_p$ for $x_p$, and computing a true residual according to $r_t = C x_p + x_f$.

In one or more embodiments of the present invention, an Algebraic Multi Grid linear solver is used for the solving of the matrix equation $(\tilde{A})^T y = d$ using the constrained pressure residual preconditioner $M_{CPRA}^{-1}$. In one or more embodiments of the present invention, Generalized Minimal Residual acceleration is used for the solving of the matrix equation $(\tilde{A})^T y = d$ a using the constrained pressure residual preconditioner $M_{CPRA}^{-1}$.

In one or more embodiments of the present invention, the solution to the matrix equation $(\tilde{A})^T y = d$ is used to solve a production optimization problem. In one or more embodiments of the present invention, the solution to the matrix equation $(\tilde{A})^T y = d$ is used to solve a history-matching problem. The solution to the matrix equation $(\tilde{A})^T y = d$ can be used to adjust a well parameter in a reservoir field. The solution to the matrix equation $(\tilde{A})^T y = d$ can be transformed into image representations that are output to a display.

DETAILED DESCRIPTION

Figure 1:
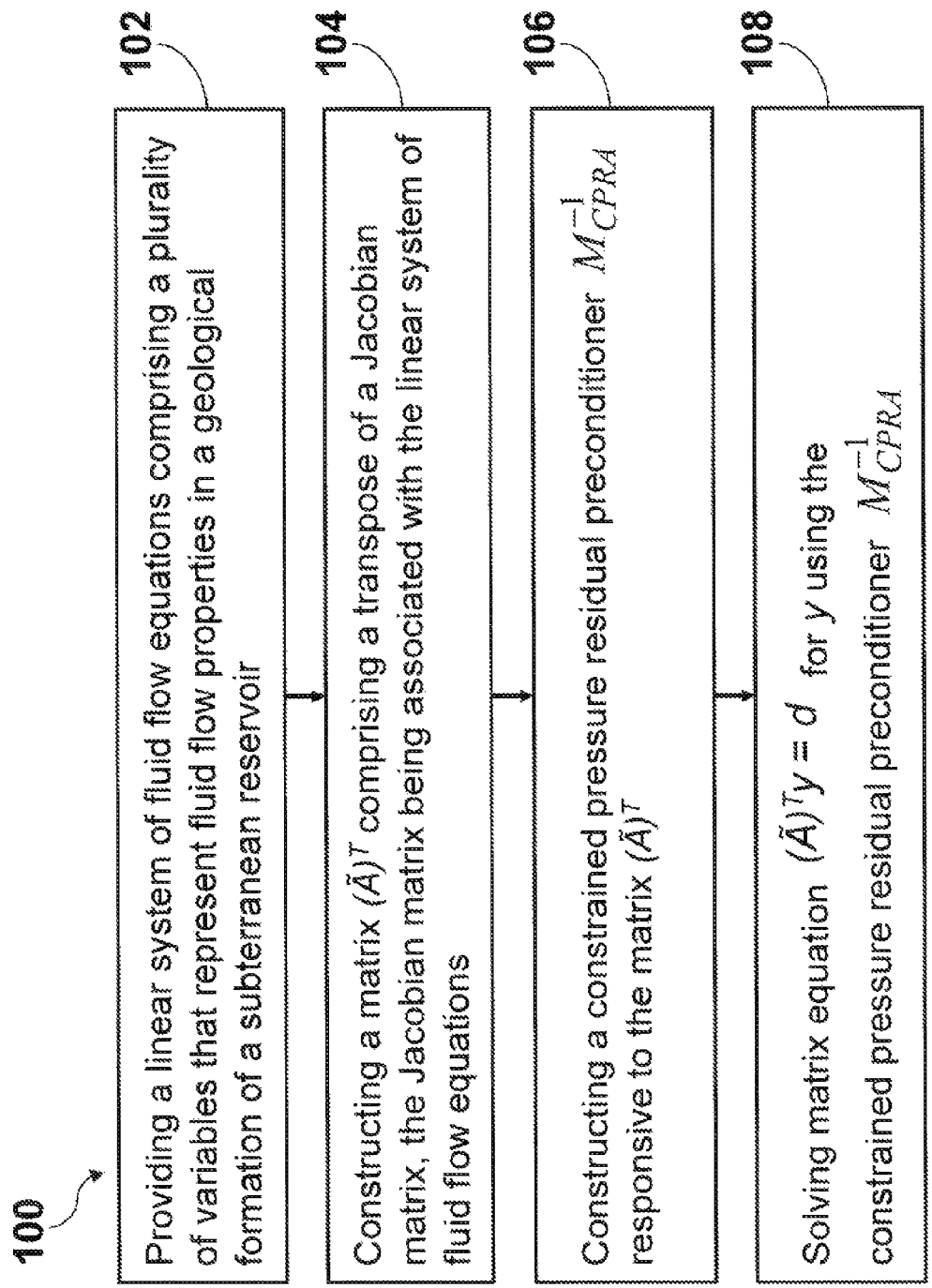
FIG. 1 is a flow diagram showing a computer-implemented method for solving adjoint models, according to an embodiment of the present invention.

A method, system and computer program product are disclosed for using a two-stage constrained pressure residual (CPR) preconditioner for efficient solution of the adjoint equation. For brevity, hereinafter, this preconditioner will be referred to as the "CPRA preconditioner" or simply, "CPRA." As will be described herein, the CPRA preconditioner is coupled with a linear solver and implemented with a reservoir simulator. For example, CPRA can be coupled with an Algebraic Multi Grid (AMG) linear solver in both serial and parallel versions of Chevron's in-house reservoir simulator CHEARS™ (Chevron Extended Applications Reservoir Simulator). The linear solver is used to solve the linear system with the "transpose" of the pressure matrix. The AMG solver has shown an outstanding capability to solve the pressure equation in complex reservoir models and therefore, will be used herein for solving the linear system with the "transpose" of the pressure matrix, which is the second stage of construction for the CPRA preconditioner.

As will be described, the CPRA combined with the AMG solver solves the adjoint equation efficiently with reasonable number of linear solver iterations, especially when using Generalized Minimal Residual (GMRES) acceleration. Adjoint simulations with the CPRA combined with the AMG solver take about the same time at most to calculate the gradients as corresponding conventional CPR preconditioners combined with the AMG forward simulations. The CPRA combined with the AMG solver is accurate, efficient, and has the capability to perform long term optimization for large, complex reservoir models at low computational cost. Accuracy of the example solutions provided herein is confirmed by verifying the gradients against solutions obtained with a direct solver.

Mathematical Derivation of the CPRA Preconditioner

The adjoint approach is generally well known to be a very efficient approach for gradient calculation, which can be used with gradient-based optimization techniques to solve various optimization problems, such as production optimization or history-matching problems. The term "optimization" (as well as derivatives, other forms of this term, and linguistically related words and phrases), as used herein, is not intended to be limiting in the sense of requiring the present invention to find the best mathematical solution or to make the best decision. Rather, this term can describe working towards a best available or favorable solution, or a solution that offers a specific benefit within a range of constraints. Accordingly, working towards the optimal solution can include searching for a high point, maximum, or minimum of an objective function, continually improving or iteratively refining a solution to convergence, reducing a penalty function, or a combination thereof.

In one embodiment, optimization involves finding a sequence of control vectors $u^n$ (of length m) for $n=0, 1, \ldots, N-1$, where n is the control step index and N is the total number of control steps, to optimize (e.g., maximize or minimize) a performance measure $J(u^0, \ldots u^{N-1})$. For example, the optimization can be described very generally with the following mathematical formulation:

$$\max_{u^n}\left[ J = \phi(x^N) + \sum_{n=0}^{N-1} L^n(x^{n+1}, u^n) \right] \forall n \in (0, \ldots, N-1) \quad \text{Equation (1)}$$

subject to:

$$g^n(x^{n+1}, x^n, u^n) = 0 \quad \forall n \in (0, \ldots, N-1)$$
$$x^0 = x_0 \quad \text{(Initial Condition)}$$
$$c^n(x^{n+1}, u^n) \leq 0 \quad \forall n \in (0, \ldots, N-1)$$
$$Au^n \leq b \quad \forall n \in (0, \ldots, N-1)$$
$$LB \leq u^n \leq UB \quad \forall n \in (0, \ldots, N-1)$$

where $x^n$ refers to the dynamic states of the system, such as pressures, saturations, and compositions. The cost function J consists of two terms. The first term $\phi$ is a function of the dynamic states of the last time step. In a production optimization application this term can represent, for example, an abandonment cost. In other embodiments, this term could represent a contract related cost or bonus depending on the state of the field at the end of the optimization period. For history matching applications, the first term $\phi$ is typically zero. The second term, which is a summation over all control steps, consists of the kernel $L^n$ known as the Lagrangian in control literature. For production optimization, $L^n$ can, for example, include the oil and water rates or functions of the saturations (e.g., sweep efficiency). For history-matching problems, it typically represents history-matching error. Since $L^n$ usually consists of well parameters or quantities that are functions of well parameters, it is written here in a fully implicit form.

The set of equations $g^n$ together with the initial condition provide the dynamic system, which are basically the reservoir simulation equations for each grid block at each time step. These equations relate the cost function J to the controls through their mutual dependence on the dynamic states $x^n$. The last three equations of Equation (1) refer to the additional constraints for the controls, that is, nonlinear constraints, linear constraints, and bounds on controls. More details on such additional constraints can be found, for example, in Sarma, P., Chen, W. H., Durlofsky, L. J., and Aziz, K., Production Optimization with Adjoint Models under Nonlinear Control-State Path Inequality Constraints, paper SPE 99959, SPE Reservoir Evaluation & Engineering, 11(2), 326-339, 2008.

In order to solve the above optimization problem using gradient-based optimization algorithms, the gradient of J with respect to $u^n$ is required. The gradient can be calculated very efficiently using the adjoint method. The adjoint model equations are obtained from the conditions of optimality of the optimization problem, for example, as defined by Equation (1). Such conditions of optimality are obtained from the classical theory of calculus of variations. For a relatively simple treatment of this subject, refer to Stengel, R. F., *Optimal Control and Estimation*, Dover Books on Advanced Mathematics, New York, 1985. The adjoint equations to be solved in order to calculate the gradient of the objective function with respect to the control variables are as follows:

$$\lambda^{Tn} = \qquad \text{Equation (2)}$$

$$-\left[\frac{\partial L^{n-1}}{\partial x^n} + \lambda^{T(n+1)}\frac{\partial g^n}{\partial x^n}\right]\left[\frac{\partial g^{n-1}}{\partial x^n}\right]^{-1} \forall n \in (1, \ldots, N-1)$$

$$\lambda^{TN} = -\left[\frac{\partial \Phi}{\partial x^N} + \frac{\partial L^{N-1}}{\partial x^N}\right]\left[\frac{\partial g^{N-1}}{\partial x^N}\right]^{-1} \text{(Final Condition)}$$

where $\lambda$ are the Lagrange multipliers and T denotes the transpose. Because $\lambda^n$ depends on $\lambda^{n+1}$, the Lagrange multipliers for the last timestep are calculated first. It is for this reason that the adjoint equation is solved backwards in time and the adjoint simulation to obtain gradients of the cost function with respect to control variables with the Lagrange multipliers is often called "backward" simulation. The gradients of the cost function with respect to the control variables are given as:

$$\frac{\partial J}{\partial u^n} = \frac{\partial J_A}{\partial u^n} \qquad \text{Equation (3)}$$

$$= \left[\frac{\partial L^n}{\partial u^n} + \lambda^{T(n+1)}\frac{\partial g^n}{\partial u^n}\right] \forall n \in (0, \ldots, N-1)$$

where $J_A$ is the augmented cost function.

$$\frac{\partial g^{n-1}}{\partial x^n}$$

in Equation (2) represents the Jacobian matrix (J) evaluated at convergence at timestep n in the forward reservoir simulation. Therefore, Equation (2) at each timestep can be rewritten in the following simplified form:

$$A^T z = d \qquad \text{Equation (4)}$$

where $$A = \bar{J}; z = \lambda \qquad \text{Equation (5)}$$

$$d = \begin{cases} -\left[\frac{\partial L^{n-1}}{\partial x^n} + \lambda^{T(n+1)}\frac{\partial g^n}{\partial x^n}\right]^T \forall n \in (1, \ldots, N-1) \\ -\left[\frac{\partial \Phi}{\partial x^N} + \frac{\partial L^{N-1}}{\partial x^N}\right]^T \text{(Final Condition)} \end{cases}$$

Equation (4) is a linear equation with the transpose of the Jacobian matrix. Because the Jacobian matrix is transposed, the adjoint equation cannot effectively be solved by a linear solver directly using a conventional preconditioner (e.g., the original CPR preconditioner) as such conventional preconditioners exploit properties of the original Jacobian matrix in order to accelerate convergence. As will be described, the CPRA preconditioner enhances the original two-stage CPR preconditioner, which has proven to be a very powerful preconditioner for reservoir simulation, to solve the adjoint equation. In one embodiment, CPRA is combined with an Algebraic Multi Grid (AMG) linear solver, which has shown to have an outstanding capability to solve the pressure equation of large and complex reservoir models in the construction of the original CPR preconditioner.

A brief description of the CPR preconditioner is provided below. Let. A be the fully implicit reservoir matrix:

$$A = \begin{bmatrix} A_{ss} & A_{sp} \\ A_{ps} & A_{pp} \end{bmatrix} \qquad \text{Equation (6)}$$

Here, subscript p refers to pressure and subscript s refers to the remaining unknowns. To solve a linear equation, Ax=b, for the forward reservoir simulation, in one embodiment, the True-IMPES reduction method is applied. Alternatively, Quasi-IMPES reduction could be used. Additional details on IMPES reduction methods can be found in U.S. Pat. No. 7,516,056, which is incorporated herein by reference. Pressure reduction is performed using the matrix N:

$$N = \begin{bmatrix} I & 0 \\ -Colsum(A_{ps})Colsum^{-1}(A_{ss}) & I \end{bmatrix} \qquad \text{Equation (7)}$$

where Colsum(B) are block diagonal matrices where the i-th main diagonal block corresponds to the sum of all the blocks in the i-th block column of B (i.e., B being any blocked matrix where the sub-matrix blocks are all the same size). Then, $$\tilde{A}x = \tilde{b} \qquad \text{Equation (8)}$$

where $\tilde{A}$=NA and $\tilde{b}$=Nb.

The CPR pressure matrix is $$A_p = C^T \tilde{A} C \qquad \text{Equation (9)}$$

where C is the ($n_{cell} \times n_{eqn}) \times n_{cell}$ pressure prolongation matrix where $n_{cell}$ is the number of cells and $n_{eqn}$ is the number of equations per cell. The CPR preconditioning matrix is given by:

$$M_{CPR}^{-1} = \tilde{M}^{-1}[I - \tilde{A}CA_p^{-1}C^T] + CA_p^{-1}C^T \qquad \text{Equation (10)}$$

where $\tilde{M}$ is an approximate factorization for $\tilde{A}$.

To adapt the CPR preconditioner to solve the adjoint equation, Equation (4) is written in the form:

$$(\tilde{A})^T y = d \quad \text{Equation (11)}$$

where $y=(N^T)^{-1}z$.

Equation (11) can be solved by applying the CPRA preconditioner $M_{CPRA}^{-1}$, which is given as:

$$M_{CPRA}^{-1} = M_{CPR}^{-T} = [I - C(A_p^T)^{-1}C^T(\tilde{A})^T](\hat{M})^{-1} + C(A_p^T)^{-1}C^T \quad \text{Equation (12)}$$

where $\hat{M}$ is an approximate factorization of $(\tilde{A})^T$. Because the CPRA preconditioner is applied to the transpose of $\tilde{A}$, it is obtained by transposing the CPR preconditioner $M_{CPRA}^{-1}$. By rearranging Equation (12), the following is obtained:

$$M_{CPRA}^{-1} = C(A_p^T)^{-1}C^T[I - (\tilde{A})^T(\hat{M})^{-1}] + (\hat{M})^{-1} \quad \text{Equation (13)}$$

For construction of the CPRA preconditioner for $(\tilde{A})^T$, the following two-stage preconditioning algorithm for residual r $(=d-(\tilde{A})^T y)$ can be used:
1) Solving $\hat{M}x_f = r$ for $x_f$ to obtain a residual. Here, in the first stage of preconditioning, factorization (e.g., ILU(k) decomposition) is applied to $(\tilde{A})^T$ to solve the full system.
2) Computing a modified residual according to $r_m = r - (\tilde{A})^T x_f$.
3) Computing a reduced residual according to $r_p = C^T r_m$.
4) Solving a transpose of a pressure matrix equation $(A_p)^T x_p = r_p$ for $x_p$. Here, in the second stage of preconditioning, the transpose of the pressure system can be solved, for example, using an Algebraic Multi-Grid (AMG) linear solver.
5) Computing a true residual according to $r_t = Cx_p + x_f$.

Steps 1 to 5 can be repeated until converged solution y is obtained. Various algorithms can be used to implement Steps 1 to 5, such as GMRES which is taught by Y. Saad and M. H. Schultz in GMRES: A Generalized Minimal Residual Algorithm for Solving Non-symmetric Linear Systems, *SIAM J. Sci. Stat. Comp.*, 7(3): 856-869, 1986. One skilled in the art will appreciate that other Krylov subspace methods and algorithms can also be used to accelerate domain decompositions such as the Flexible Generalized Minimal Residual Algorithm (FGMRES) taught by Y. Saad in A Flexible Inner-Outer Preconditioned GMRES Algorithm, *SIAM J. Sci. Stat. Comp.*, 14(2): 461-469, 1993; the Orthogonal Minimization (ORTHOMIN) algorithm as taught by P. K. W. Vinsome in Orthomin, an Iterative Method for Solving Sparse Sets of Simultaneous Linear Equations, which was presented at the SPE Symposium on Numerical Simulation of Reservoir Performance, Feb. 19-20, 1976 in Los Angeles, Calif.; the Bi-Conjugate Gradient Stabilized (Bi-CO STAB) algorithm as taught by H. A. van der Vorst in Bi-CGSTAB: A Fast and Smoothly Converging Variant of Bi-CG for the Solution of Nonsymmetric Linear Systems, *SIAM J. Sci. Stat. Comp.*, 13(2): 631-644, 1992; and the Generalized Conjugate Residual (GCR) algorithm as taught by S. C. Eisenstat, H. C. Edman, and M. H. Schultz in Variational Iterative Methods for Nonsymmetric Systems of Linear Equations, *SIAM Journal of Numerical Analysis*, 20(2): 345-357, 1983. With the converged solution y for matrix equation $(\tilde{A})^T y = d$, the solution Z to Equation (4) can be obtained by $z=N^T y$.

Those skilled in the art will appreciate that the above described methods may be practiced using any one or a combination of computer processing system configurations, including, but not limited to, single and multi-processor systems, hand-held devices, programmable consumer electronics, mini-computers, or mainframe computers. The above described methods may also be practiced in distributed or parallel computing environments where tasks are performed by servers or other processing devices that are linked through one or more data communications networks. For example, the large computational problems arising in reservoir simulation can be broken down into smaller ones such that they can be solved concurrently—or in parallel. In particular, the system can include a cluster of several stand-alone computers. Each stand-alone computer can comprise a single core or multiple core microprocessors that are networked through a hub and switch to a controller computer and network server. An optimal number of individual processors can then be selected for a given problem based on factors such as reservoir partitioning where the reservoir grid cells are divided into domains that are assigned to the individual processors.

As will be described, the invention can be implemented in numerous ways, including for example as a method (including a computer-implemented method), a system (including a computer processing system), an apparatus, a computer readable medium, a computer program product, a graphical user interface, a web portal, or a data structure tangibly fixed in a computer readable memory. Several embodiments of the present invention are discussed below. The appended drawings illustrate only typical embodiments of the present invention and therefore are not to be considered limiting of its scope and breadth.

FIG. 1 depicts a flow diagram of an example computer-implemented method 100 for use in modeling fluid flow in the geological formation of the reservoir. In step 102, a linear system of fluid flow equations comprising a plurality of variables that represent fluid flow properties in a geological formation of a subterranean reservoir is provided. For example, the linear system of fluid flow equations can be written in the form of $\tilde{A}x=\tilde{b}$. In step 104, matrix $(\tilde{A})^T$ comprising a transpose of a Jacobian matrix is constructed. The Jacobian matrix is associated with the linear system of fluid flow equations from step 102. For example, matrix $(\tilde{A})^T$ can be assembled by performing matrix manipulation of matrix $\tilde{A}$. A constrained pressure residual, preconditioner $M_{CPRA}^{-1}$ is constructed responsive to the matrix $(\tilde{A})^T$ in step 106. In step 108, a matrix equation $(\tilde{A})^T = d$ is solved using the constrained pressure residual preconditioner $M_{CPRA}^{-1}$. Accordingly, an output of method 100 can be solution vector y.

Figure 2:
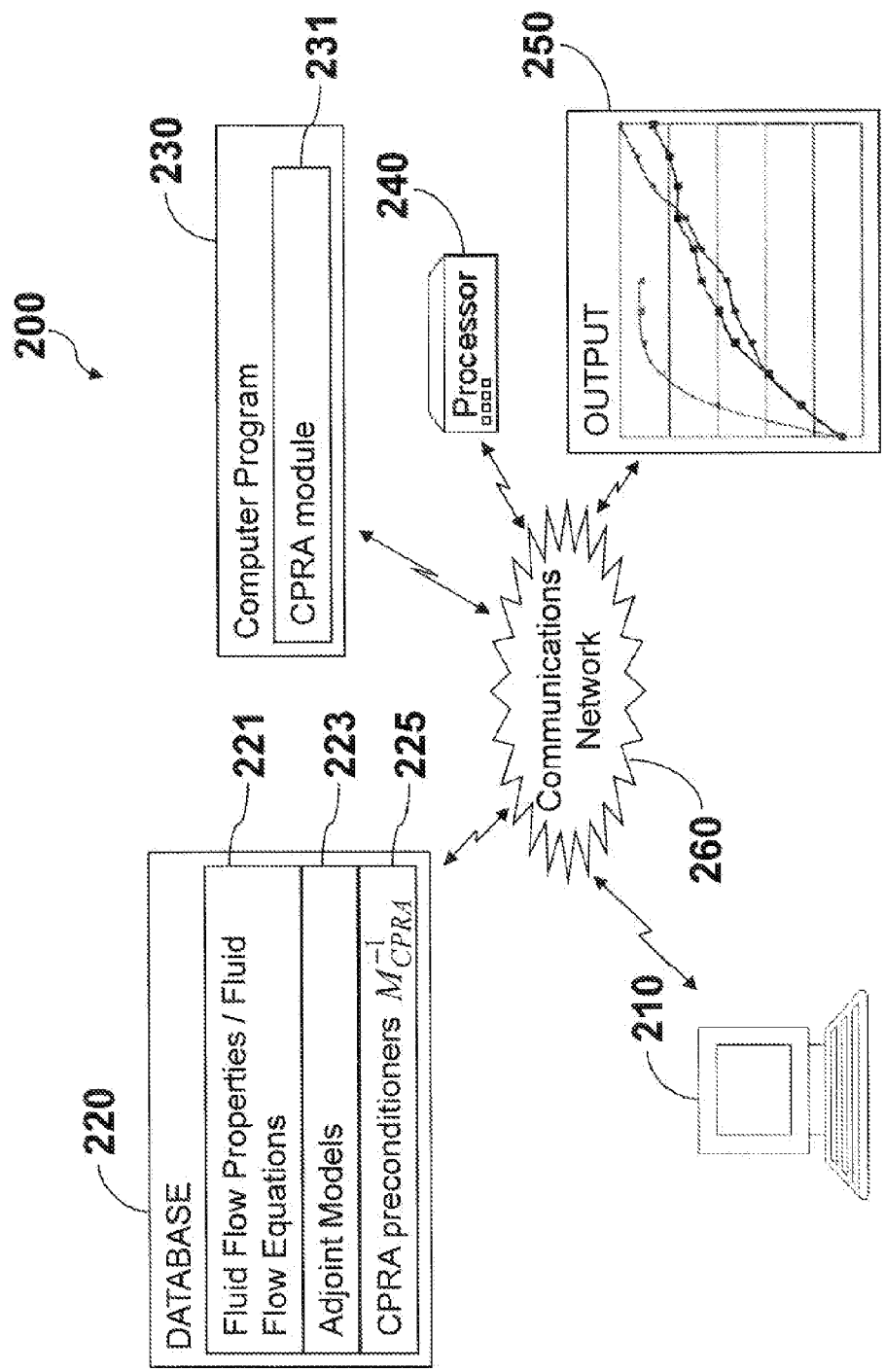
FIG. 2 shows a system for solving adjoint models, according to an embodiment of the present invention.

FIG. 2 illustrates an example computer system 200 for solving adjoint models, such as by implementing the methods disclosed herein including method 100. System 200 includes user interface 210, such that an operator can actively input information and review operations of system 200. User interface 210 can be any means in which a person is capable of interacting with system 200 such as a keyboard, mouse, or touch-screen display. In some embodiments, user interlace 210 embodies spatial computing technologies, which typically rely on multiple core processors, parallel programming, and cloud services to produce a virtual world in which hand gestures and voice commands are used to manage system inputs and outputs.

Operator-entered data input into system 200 through user interface 210, can be stored in database 220. For example, operator-entered data can include user defined parameters and fluid flow properties/equations 221, which can include linear systems of fluid flow equations that comprise a plurality of variables representing fluid flow properties in a geological formation of a subterranean reservoir. Additionally, any information generated by system 200 such as adjoint models 223, which includes matrix $(\tilde{A})^T$ comprising a transpose of a Jacobian matrix, and constrained pressure residual preconditioner $M_{CPRA}^{-1}$ 225 and can be stored in database 220.

System 200 includes software or computer program 230 that is stored on a non-transitory computer usable or processor readable medium. Current examples of such non-transitory medium include, but are not limited to, read-only memory (ROM) devices, random access memory (RAM) devices and semiconductor-based memory devices. This includes flash memory devices, programmable ROM (PROM) devices, erasable programmable ROM (EPROM) devices, electrically erasable programmable ROM (EEPROM) devices, dynamic RAM (DRAM) devices, static RAM (SRAM) devices, magnetic storage devices (e.g., floppy disks, hard disks), optical disks (e.g., compact disks (CD-ROMs)), and integrated circuits. Non-transitory medium can be transportable such that the one or more computer programs (i.e., a plurality of instructions) stored thereon can be loaded onto a computer resource such that when executed on the one or more computers or processors, performs the aforementioned functions of the various embodiments of the present invention.

Computer system 200 includes one or more modules and/or is in communication with one or more devices (e.g., a linear solver) configured to perform any step of any of the methods (e.g., method 100) described herein. For example, computer program 230 includes CPRA module 231. Processor 240 interprets instructions or program code encoded, on the non-transitory medium to execute computer program 230, as well as, generates automatic instructions to execute software for system 200 responsive to predetermined conditions. Instructions from both user interface 210 and computer program 230 are processed by processor 240 for operation of system 200. In some embodiments, a plurality of processors 240 is utilized such that system operations can be executed more rapidly.

In certain embodiments, system 200 includes reporting unit 250 to provide information to the operator or to other systems (not shown). For example, reporting unit 250 can be a printer, display screen, or a data storage device. However, it should be understood that system 200 need not include reporting unit 250, and alternatively user interface 210 can be utilized for reporting information of system 200 to the operator.

Communication between any components of system 200, such as user interface 210, database 220, computer program 230, processor 240 and reporting unit 250, can be transferred over communications network 260. Computer system 200 can be linked or connected to other, remote computer systems (e.g., a forward simulation module) via communications network 260. Communications network 260 can be any means that allows for information transfer to facilitate sharing of knowledge and resources, and can utilize any communications protocol such as the Transmission Control Protocol/Internet Protocol (TCP/IP). Examples of communications network 260 include, but are not limited to, personal area networks (PANs), local area networks (LANs), wide area networks (WANs), campus area networks (CANS), and virtual private networks (VPNs). Communications network 260 can also include any hardware technology or equipment used to connect individual devices in the network, such as by wired technologies (e.g., twisted pair cables, co-axial cables, optical cables) or wireless technologies (e.g., radio waves).

In operation, an operator initiates computer program 230, through user interface 210, to solve adjoint models 223 (e.g., Equation 4). For example, CPRA module 231 can retrieve fluid flow properties/equations 221 stored in database 220. This retrieved information can include information to solve matrix equations $\tilde{A}x=\tilde{b}$ and/or $(\tilde{A})^T y=d$, such as values of matrix $\tilde{A}$ and/or matrix $(\tilde{A})^T$, known values of vector $\tilde{b}$ and/or vector d, parameters of solution vector x and/or solution vector y, or a combination thereof. CPRA module 231 constructs matrix $(\tilde{A})^T$ comprising a transpose of a Jacobian matrix. CPRA module 231 constructs constrained pressure residual preconditioner $M_{CPRA}^{-1}$ 225 responsive to matrix $(\tilde{A})^T$. CPRA module can communicate with a linear solver (not shown), such as an AMG solver, to solve matrix equation $(\tilde{A})^T y=d$ using the constrained pressure residual preconditioner $M_{CPRA}^{-1}$ 225. Accordingly, a solution vector y for matrix equation $(\tilde{A})^T y=d$ can be obtained.

A visual display can be produced, such as through reporting unit 250 or user interface 210, using output from system 200. For example, system 200 can output information related to adjoint models 223, which includes solutions to the adjoint equation, which can be transformed into image data representations for display to a user or operator. The displayed information can be utilized to forecast or optimize the production performance of the subterranean reservoir, which can then be used for reservoir management decisions. For example, output from system 200 can include cumulative fluid injection amounts, fluid injection rates, cumulative fluid production amounts, fluid production rates, bottom hole pressure (BHP) profiles for injectors and producers, and the net present value (NPV) of an optimized case.

EXAMPLE RESULTS

Computational performance of the CPRA combined with the AMG solver is demonstrated below using three example cases. A production optimization example case study for a real field using the CPRA combined with the AMG solver is also provided to further validate its accuracy, efficiency, and the capability to perform long term optimization for a large, complex, reservoir models at low computational cost.

Referring to FIGS. 3-6, for validation and evaluation of performance, CPRA has been implemented with the AMG solver in the Chevron's proprietary reservoir simulator, CHEARS™ (in both serial and parallel versions of CHEARS™). The following three example cases are used to evaluate the performance of CPRA:

Case 1: Synthetic case, 10×10×3 (=300) grids with 264 active grids, BLACKOIL option, 2 water injectors and 1 producer.

Case 2: Field A case, 86×100×8 (=68,800) grids with 39,265 active grids, BLACKOIL option, 5 water injectors, 5 producers.

Case 3: Field B case, 96×73×150 (=1,051,200) grids with 164,281 active grids, BLACKOIL option, 11 water injectors, 15 producers.

Here, Fields A and B represent physical reservoir fields. "BLACKOIL option" refers to simulation that does not consider changes in composition of the hydrocarbons as the field is produced.

Figure 3:
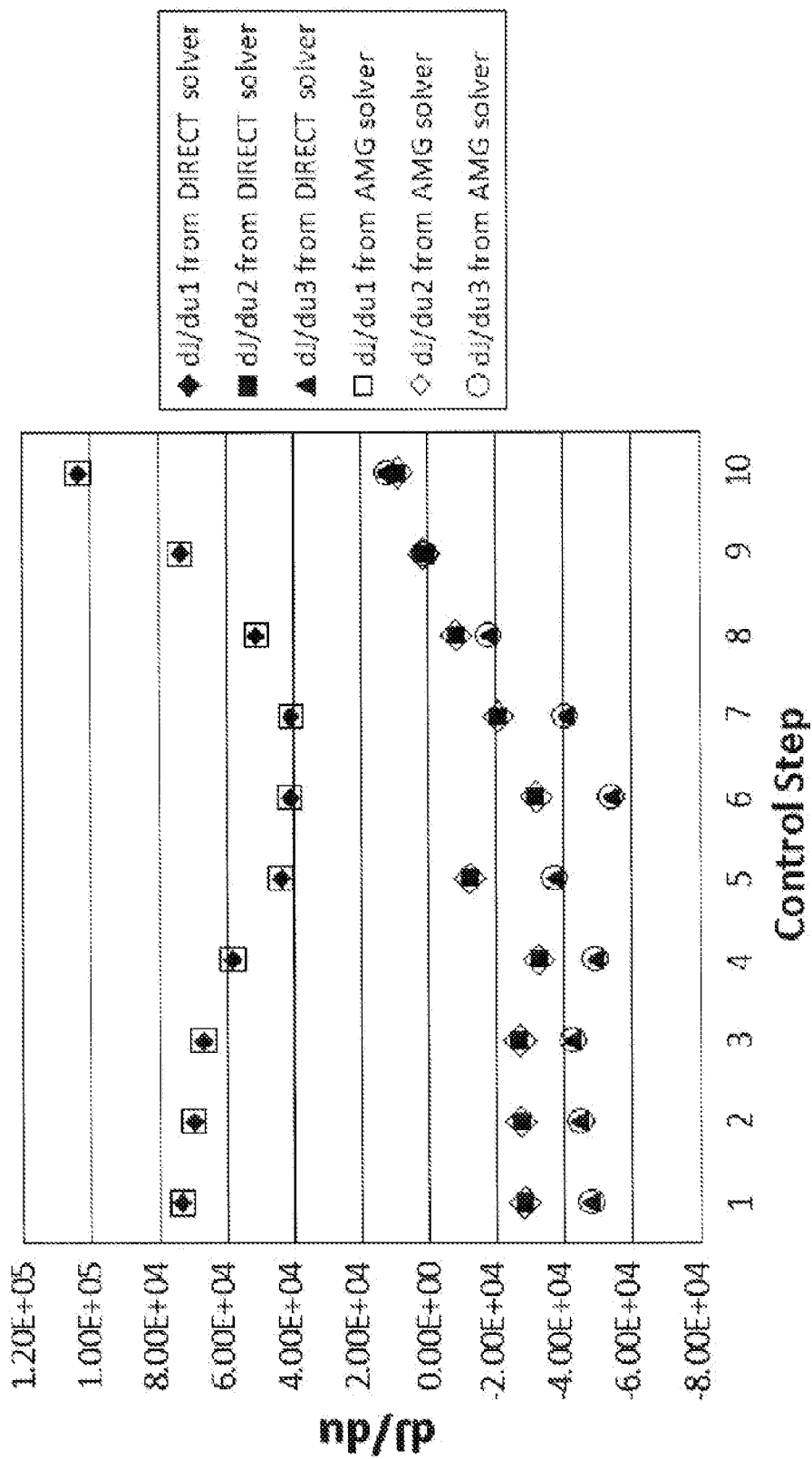
FIG. 3 is graph showing a comparison of dJ/du between a direct solver and an AMG solver using a CPRA preconditioner.

FIG. 3 shows a comparison of dJ/du for a direct solver and the AMG solver with the CPRA preconditioner. As shown in FIG. 3, the gradient of the objective function with respect to control variable i (=dJ/du$_i$) from the AMG solver with the CPRA preconditioner is the same as that obtained using the direct solver. Example case 1 is used in this comparison because the adjoint equation of this case is relatively easy for the direct solver to solve as its size is a relatively small linear system.

Figure 4:
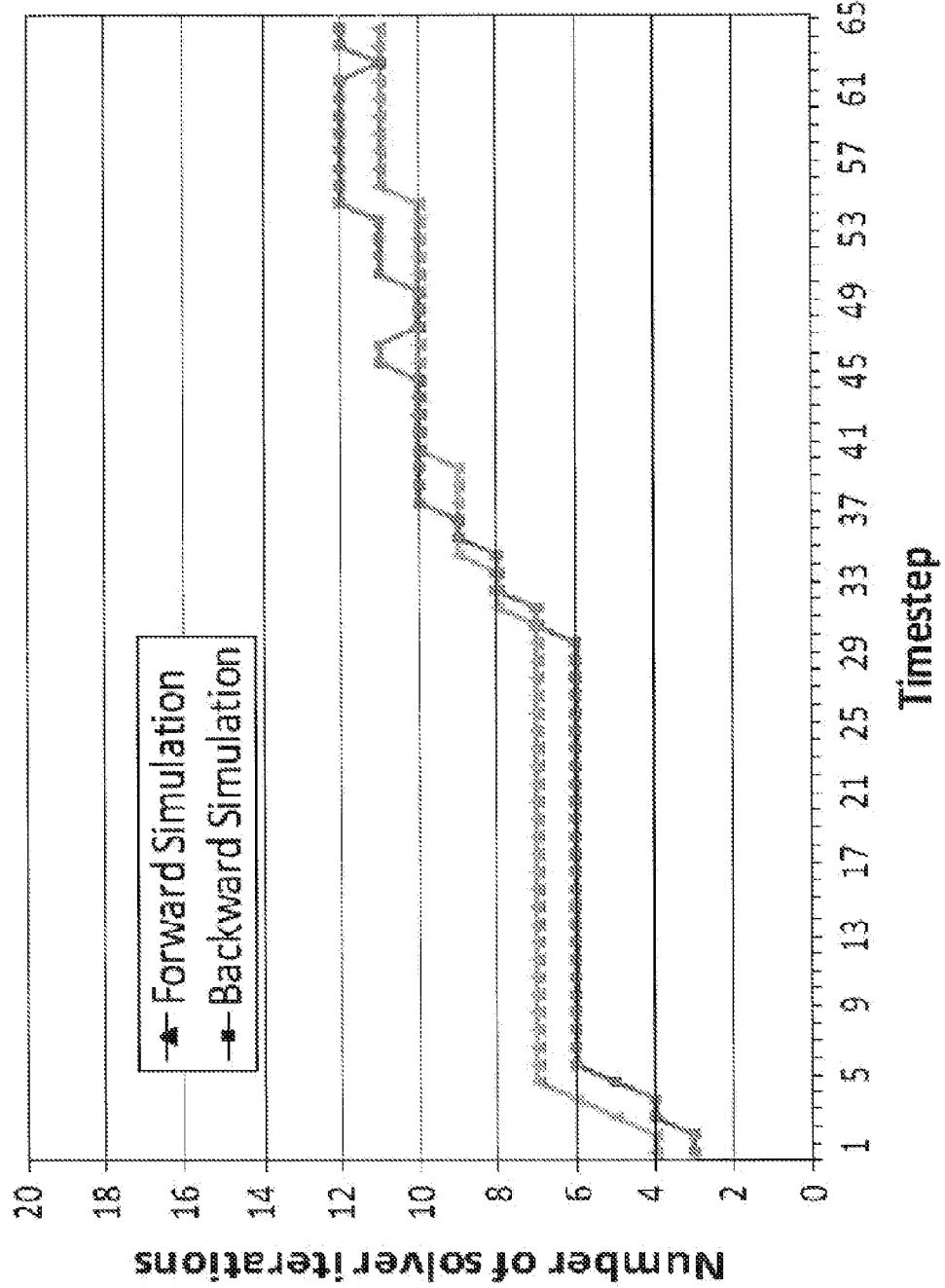
FIGS. 4-6 are graphs showing the number of iterations for an AMG solver at each timestep during forward and backward simulations for various example cases.
Figure 5:
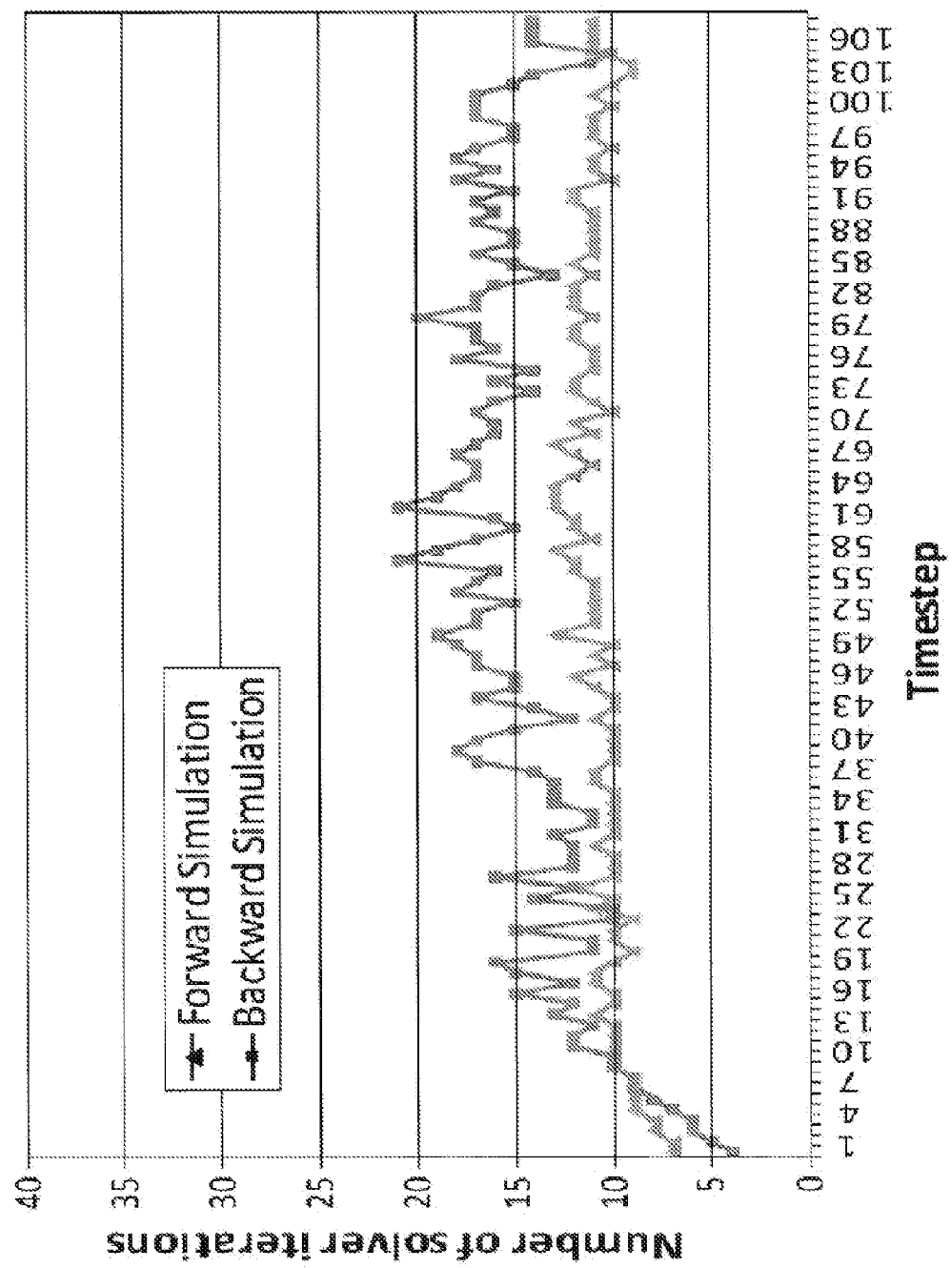
Figure 6:
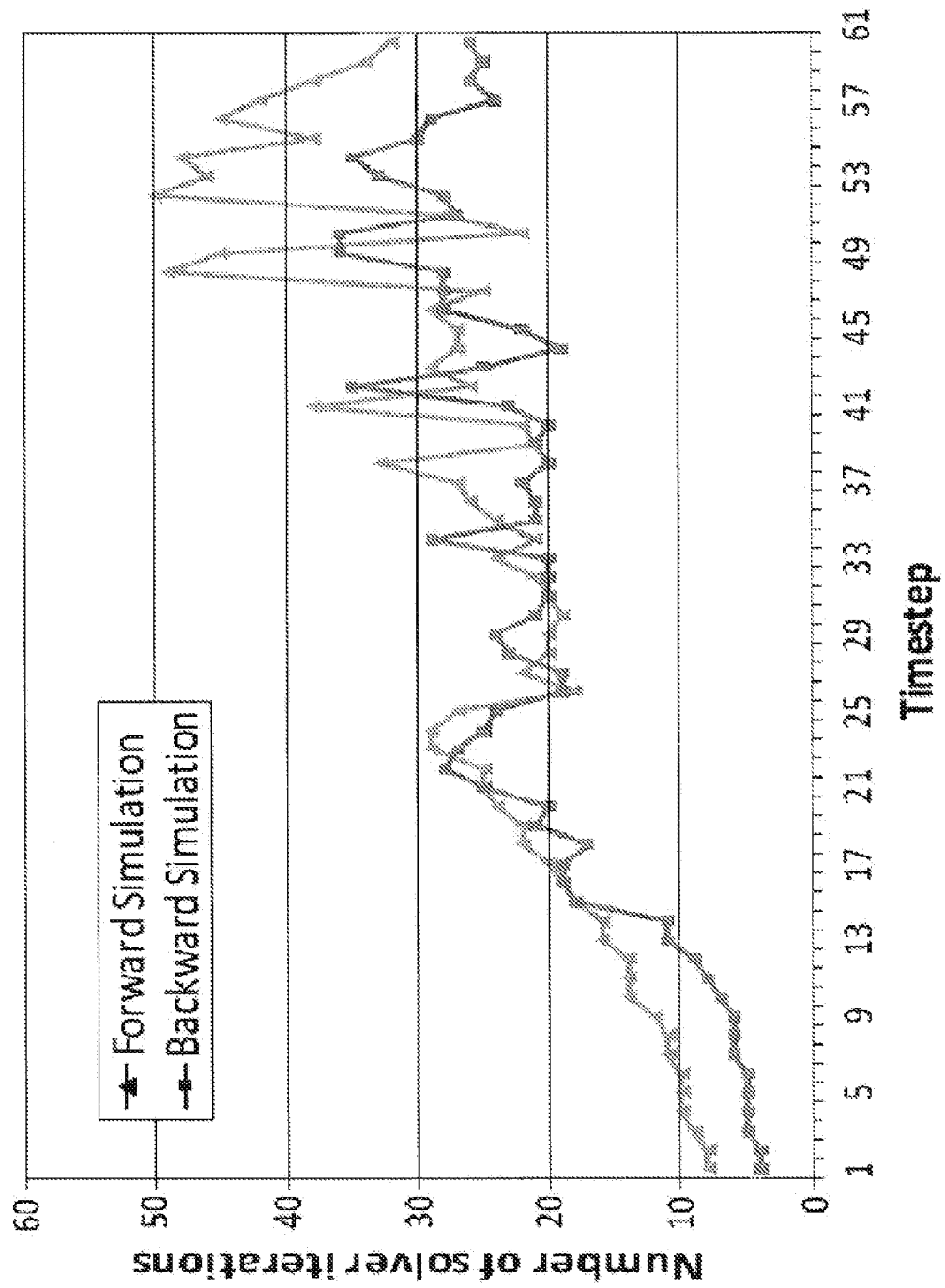

FIGS. 4-6 show the number of iterations of the AMG solver using the original CPR preconditioner to solve $\tilde{A}x=\tilde{b}$ at each timestep in the forward simulation for each case. In particular, FIG. 4 shows the number of AMG solver iterations over timesteps in the forward simulations for Case 1. FIG. 5 shows the number of AMG Solver iterations over timesteps in the forward simulations for Case 2. FIG. 6 shows the number of AMG solver iterations over timesteps in the forward simulations for Case 3. The number of iterations of the AMG solver using the CPRA preconditioner to solve $(\tilde{A})^T y = d$ at each timestep in the backward simulation is also shown in each of FIGS. 4-6. Here, $\tilde{A}$ is the Jacobian matrix evaluated at the convergence of Newton iteration at a timestep. The same tolerance parameter values are used to solve both $\tilde{A}x=\tilde{b}$ and $(\tilde{A})^T y = d$ with the AMG solver.

As shown in FIGS. 4-6, the number of iterations of the AMG solver with the CPRA preconditioner in the backward simulation are similar with that from the original CPR preconditioner in the forward simulation, which indicates a similar performance of the preconditioners in solving the linear equations. Here, the eigenvalues of the CPRA preconditioned matrix are identical to the eigenvalues of the CPR preconditioned matrix. Thus, the asymptotic convergence rate should be the same regardless of right hand side values. Accordingly, if the original CPR preconditioner is working well for a matrix, then the CPRA preconditioner should also work well for the transpose of the matrix.

In FIG. 4, the number of iterations of the AMG solver with CPR preconditioner in the forward simulation appears quite large for the small size of problem, which has $10 \times 10 \times 3$ grids. This is because a tight tolerance for both the backward and forward simulation was used for a fair comparison. In particular, a very small maximum relative residual of $10^{-9}$ was used as the tolerance to determine convergence. Numerical solution to the adjoint equation is highly dependent on tolerance, and a tight tolerance should be used to obtain reasonable solution. For example, a maximum relative residual less than or equal to $10^{-9}$ should typically be used to solve the adjoint equation.

For comparison purpose, an Incomplete LU (ILU) preconditioner with GMRES algorithm was also used for the backward simulations. For the first example case, the solver provided the same $dJ/du_i$ as the direct solver when the infill level value was increased with a tightened tolerance. However, this required very high computational cost with no benefit of using the preconditioner. For the second and third example cases, even with relatively large infill values (which required significant run time) the solver returned incorrect $dJ/du_i$ due to convergence failure.

Application to a Production Optimization Problem.

The gradients obtained from CHEARS™ are used with a sequential quadratic programming (SQP) algorithm to solve the production optimization problem described by Equation (1). Such a SQP can be that as taught in Rao, S. S., *Engineering Optimization: Theory and Practice*, John Wiley and Sons Ltd, New York, N.Y., 2009. The simulation model used is that of an actual reservoir, and was chosen because it is fairly large and complex. Furthermore, direct and other simple solvers using conventional preconditioners are not practically applicable for this problem due to its size and corresponding significant computational cost. This model has been used by others to test ensemble based optimization. See, for example, Chaudhri, M., Liu, N., and Phale, H. A., An Improved Approach For Ensemble Based Production Optimization Application To A Field Case, paper SPE 121307 presented at the SPE EUROPEC Conference, Amsterdam, 2009. These results allow us to compare adjoint-based optimization to ensemble-based optimization. Details on ensemble-based optimization, which will be helpful for appreciating such a comparison, can be found in Chen, Y., Oliver, D. S., and Zhang, D., Efficient Ensemble-based Closed-loop Production Optimization, SPE Journal, 14(4), 634-645, 2009.

Reservoir Field B, which is an off-shore field and is the same field used in example case 3 for evaluating the performance of the CPRA combined with the AMG solver, is now utilized for adjoint-based optimization. The average depth of the reservoir is about 7000 ft (2133.6 m) and the initial pressure is around 3300 psia (15.1 MPa) at a datum depth of 7250 ft (2209.8 m). The bubble point pressure of the reservoir is assumed to be approximately 2195 psia (22.8 MPa). Thus, the reservoir is initially undersaturated and has no gas cap. The reservoir temperature is 130° F. (978 K). The field has an average porosity of about 31% and average permeability of 900 md. The oil water contact is located at a depth of 7973 ft (2430.2 m). The simulation model has grid dimensions of $96 \times 73 \times 150$. The size of a grid-block in the x-direction is approximately 245 ft (74.7 m) and varies between 190 ft (57.9 m) to 335 ft (102.1 m) in the y-direction. The thickness of an individual layer shows a wide variation between 0.1 ft (0.03 m) to 275 ft (83.8 m). There are 15 producers and 11 injectors in the simulation model. The completion interval is different for different wells. The reservoir properties (e.g. porosity and permeability) are assumed to be known without any uncertainty.

Total fluid production (reservoir volume) rate is the primary constraint on the producers whereas the injectors are constrained by the total water injection (reservoir volume) rate. The producers and the injectors are also constrained by the bottom hole pressure (BHP) limits. The producers are constrained by a minimum bottom hole pressure of 2240 psia (15.4 MPa) whereas the injectors are constrained by a maximum bottom hole pressure of 4700 psia (32.4 MPa). Additionally, the producers and injectors also have group constraints of total fluid production rate and total water injection rate, respectively. The BHP constraints are simple bound constraints and are handled directly by the optimizer. The other constraints are nonlinear constraints and are handled in a manner known in the art by the simulator itself—see for example Sarma, P., Chen, W. H., Durlofsky, L. J., and Aziz, K., Production Optimization with Adjoint Models tinder Nonlinear Control-State Path Inequality Constraints, paper SPE 99959, SPE Reservoir Evaluation & Engineering, 11(2), 326-339, 2008.

For this field, it is assumed that the water injection is started from day 1 and is continued throughout the life of the water flooding project (3960 days). Optimization of the net present value (NPV) of the reservoir over the project life is performed. The control variables are the bottom hole pressures for both the producers and the injectors, and the control step size for both producers and injectors is considered as 180 days, which results in 22 control steps per well for the optimization problem. Therefore, for a total of 26 wells (15 producers and 11 injectors), a set of 572 control variables are optimized. Some of the other parameters used in the optimization procedure include, for example, oil price of $70/bbl, water disposal cost of $10/bbl, discount rate of 0% per year, and an ensemble of 40 realizations of control variables.

In order to understand the benefit of any optimization process, it is usually desirous to compare the optimization results against a base or reference case. In the case of production optimization, such a base case would be a reasonable production strategy that an engineer would devise given a simulation model and a set of constraints. In general, although an engineer's intuition and knowledge about a reservoir plays an important role in determining optimum or near-optimum well locations, it is very difficult to understand the implications of varying well controls such as rates manually on the optimization process. It is thus usual for engineers to specify constant production/injection rates or BHPs until some detrimental reservoir response such as breakthrough is observed.

For the purpose of this case study, the base (or reference) case is a constant production/injection rate strategy (unless other constraints are hit). The group constraint of total fluid production rate is equally distributed among all producers. Therefore, in the base case, all the producers are allowed to produce at an equal production rate throughout the water flooding project. In a similar manner, the group constraint of total fluid injection rate is equally distributed among all injectors, allowing each injector to inject water at an equal rate.

Figure 7:
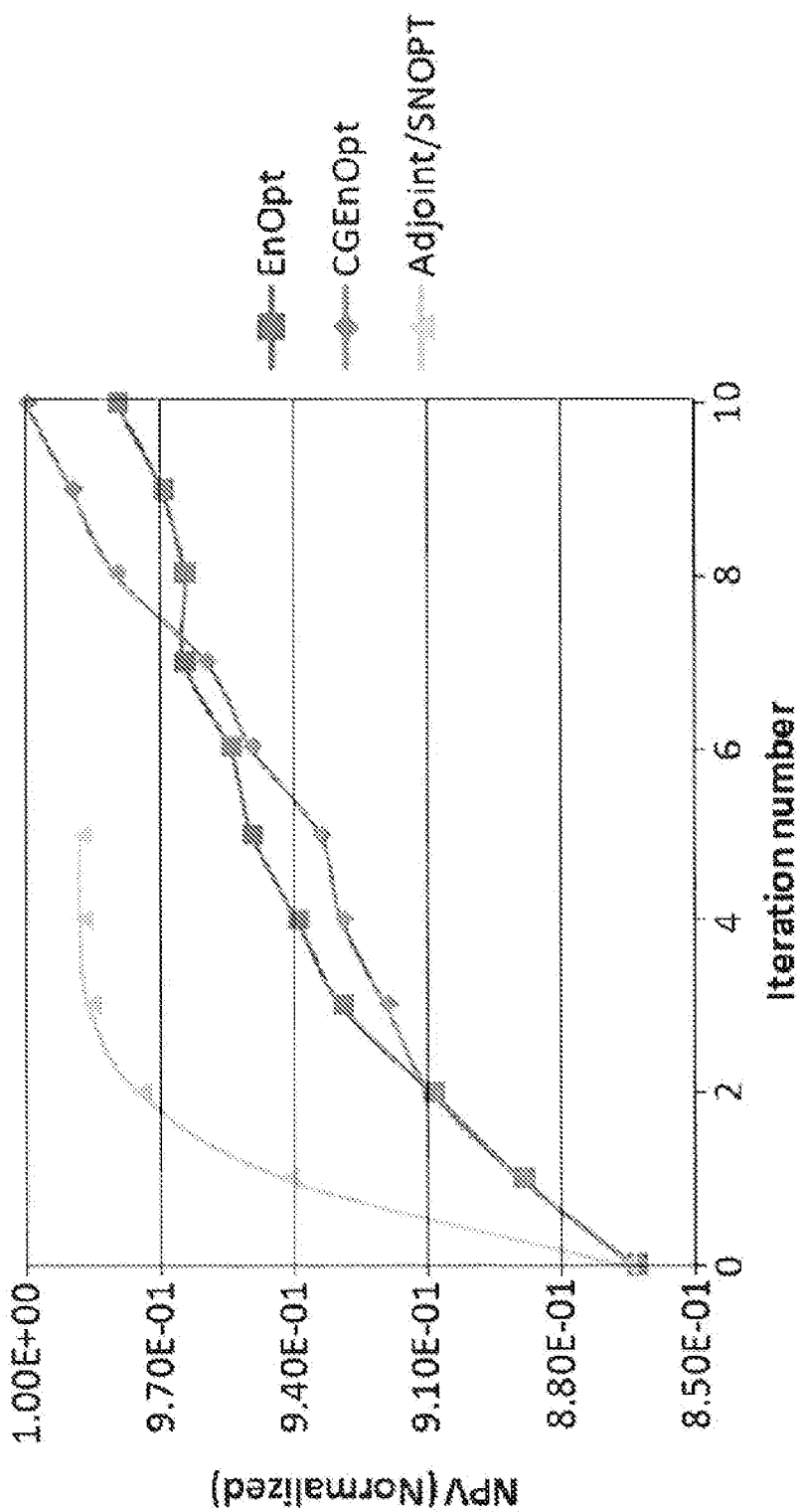
FIG. 7 is a graph showing a comparison of normalized net present value (NPV) for a production optimization example case.

FIG. 7 shows the increase in net present value (NPV) with iterations for SQP/Adjoint with CPRA combined with the AMG solver (line with triangular points) and also that from two ensemble-based approaches. The line with square points is from the original ensemble-based optimization as described by Y. Chen, D. S. Oliver, and D. Zhang in Efficient Ensemble-based Closed-loop Production Optimization, *SPE Journal*, 14(4), 634-645, 2009. The line with diamond points is from the conjugate gradient based ensemble optimization as described by M. Chaudhri, N. Liu, and H. A. Phale in An Improved Approach For Ensemble Based Production Optimization: Application To A Field Case, paper SPE 121307 presented at the SPE EUROPEC Conference, Amsterdam, 2009. All methods lead to a significant increase in NPV (about 17%) over the base case. Further, it is shown that the SQP/Adjoint approaches close to the maximum NPV after 3 iterations which requires 8 simulations. Both ensemble haled methods require on the order of 600 simulations to reach the same level of NPV. This demonstrates the accuracy, efficiency, and the capability of CPRA combined with the AMG solver to perform long term optimization for large, complex reservoir models at low computational cost. This also demonstrates the benefit of adjoint-based optimization over ensemble optimization for large-scale models for which hundreds of simulations are currently not practically possible.

Figure 8:
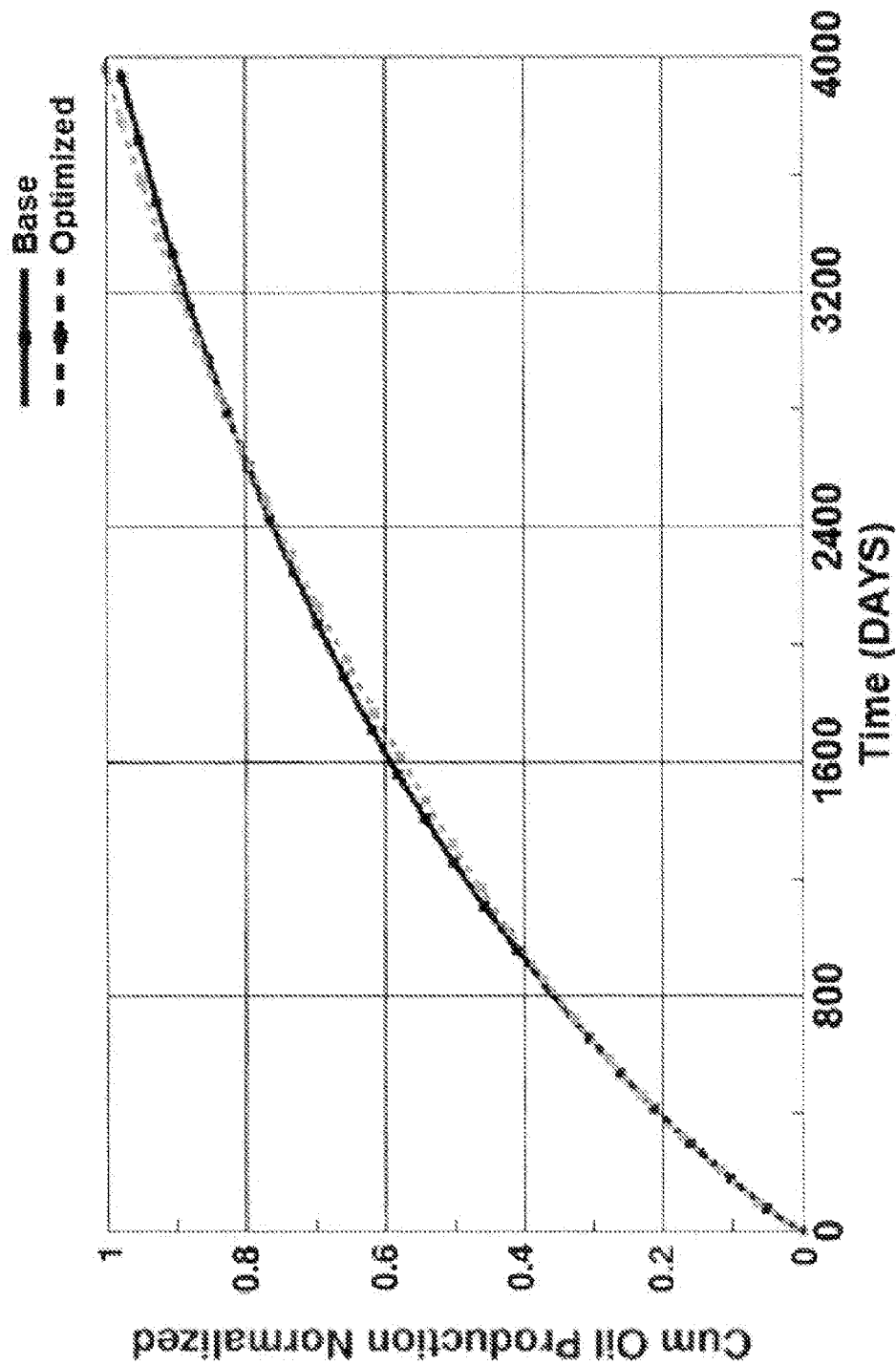
FIG. 8 is a graph showing a comparison of normalized cumulative oil production for a production optimization example case.
Figure 9A:
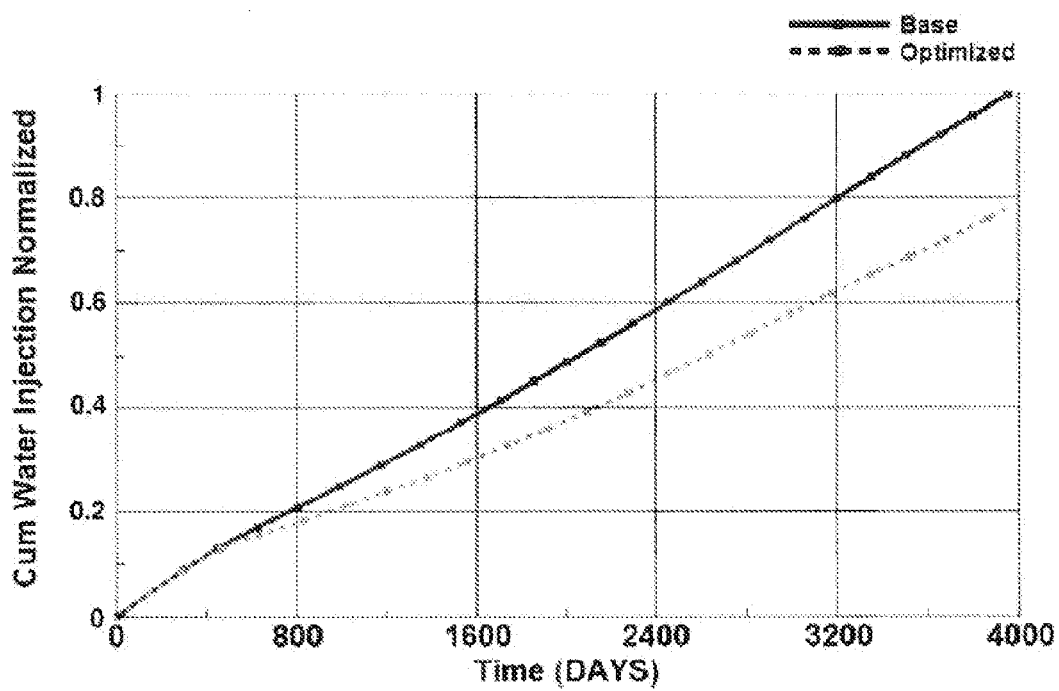
FIGS. 9A-9D are graphs showing normalized cumulative water injection (FIG. 9A), normalized cumulative water production (FIG. 9B), normalized water injection rates (FIG. 9C), and normalized water production rates (FIG. 9D) for a production optimization example case.
Figure 9B:
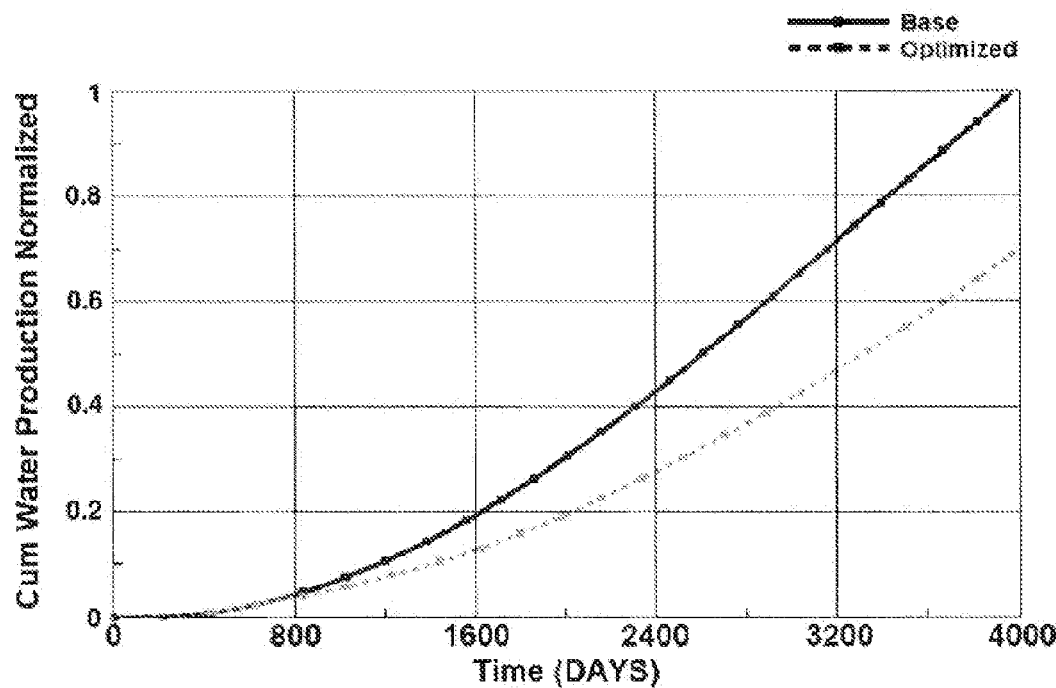
Figure 9C:
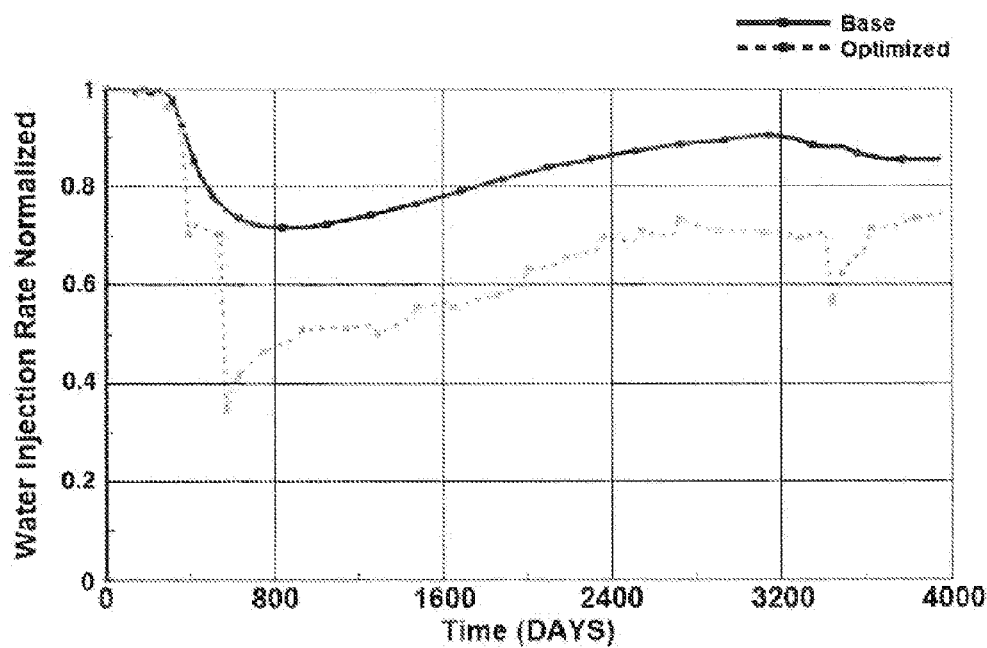
Figure 9D:
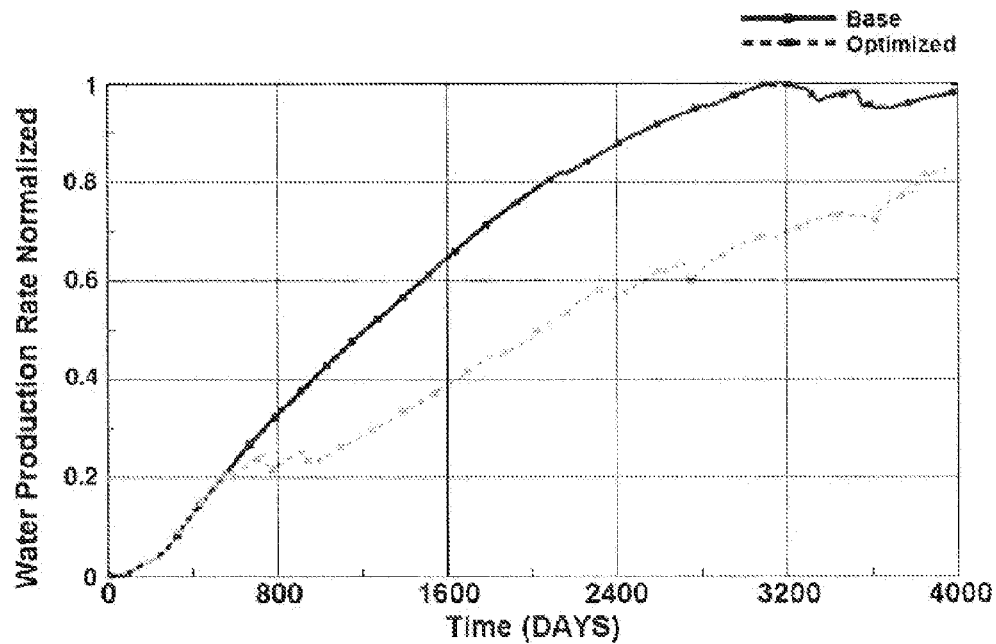
Figure 10A:
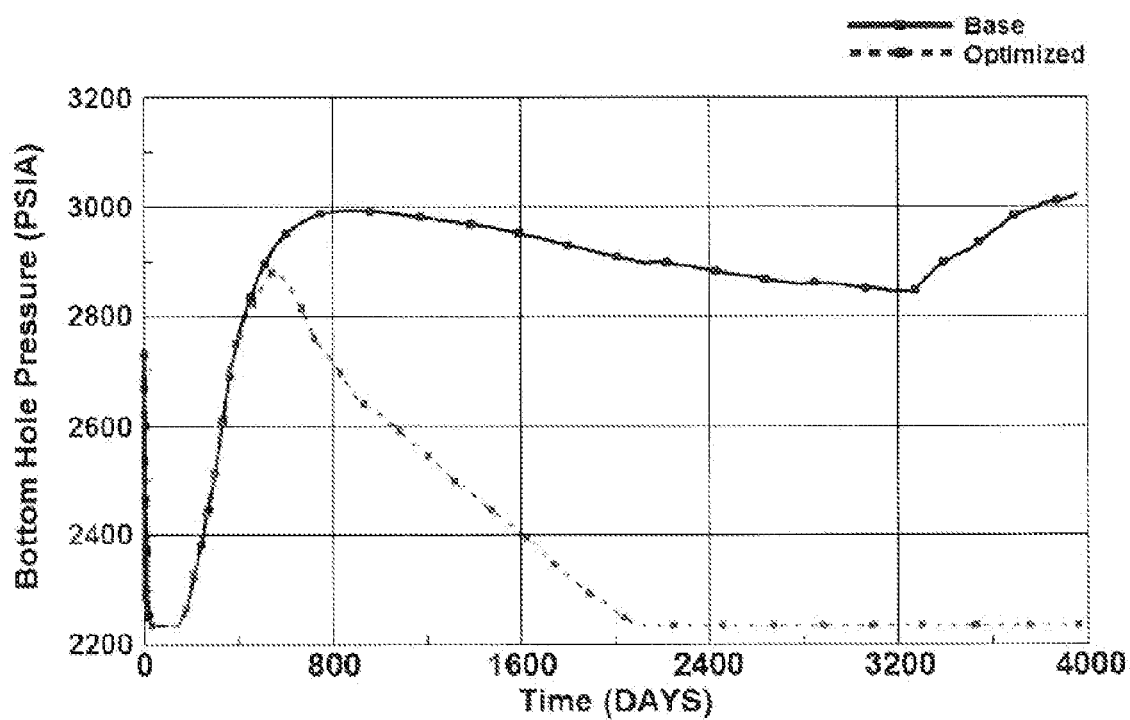
FIGS. 10A-10D are graphs showing bottom hole pressure (BHP) profiles for producers and injectors in a production optimization example case.
Figure 10B:
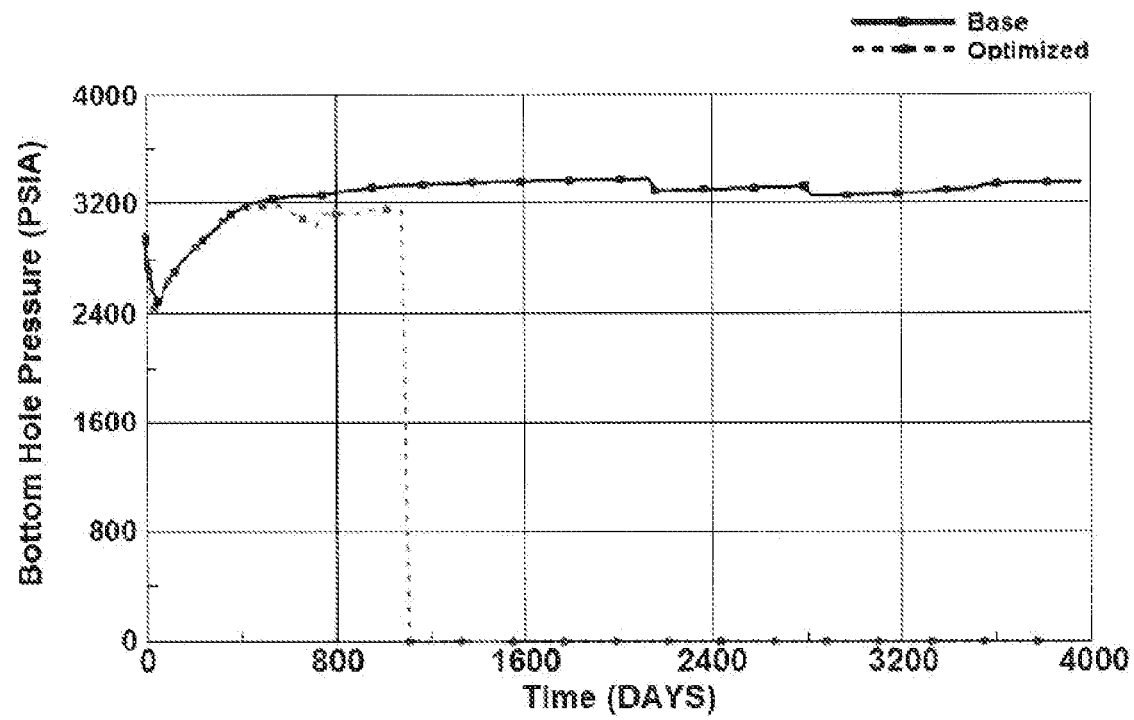
Figure 10C:
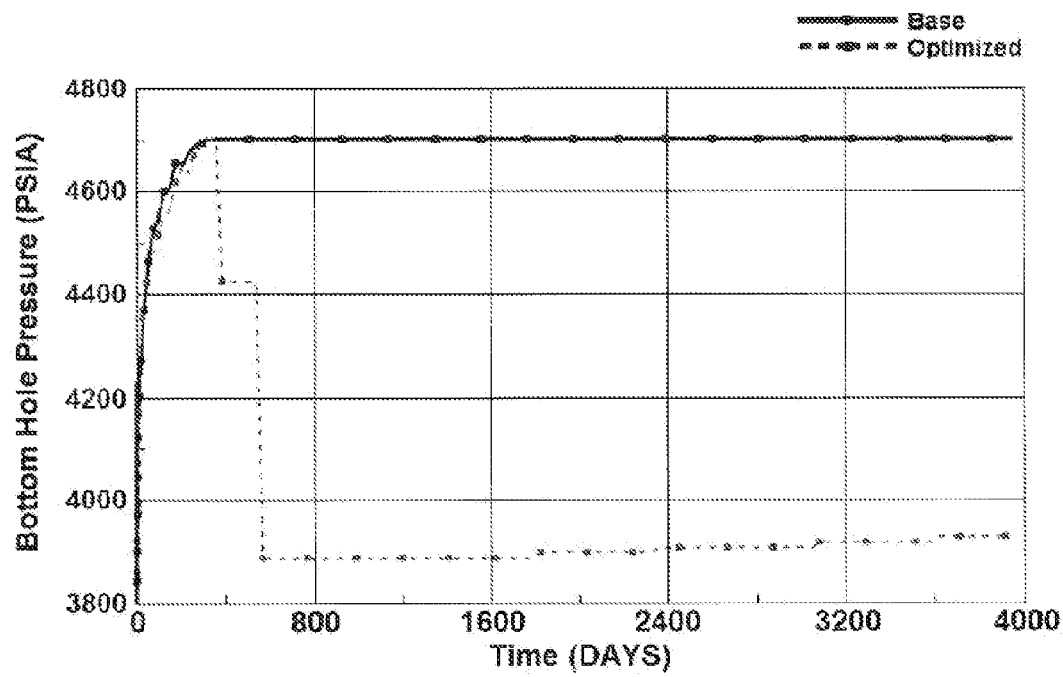
Figure 10D:
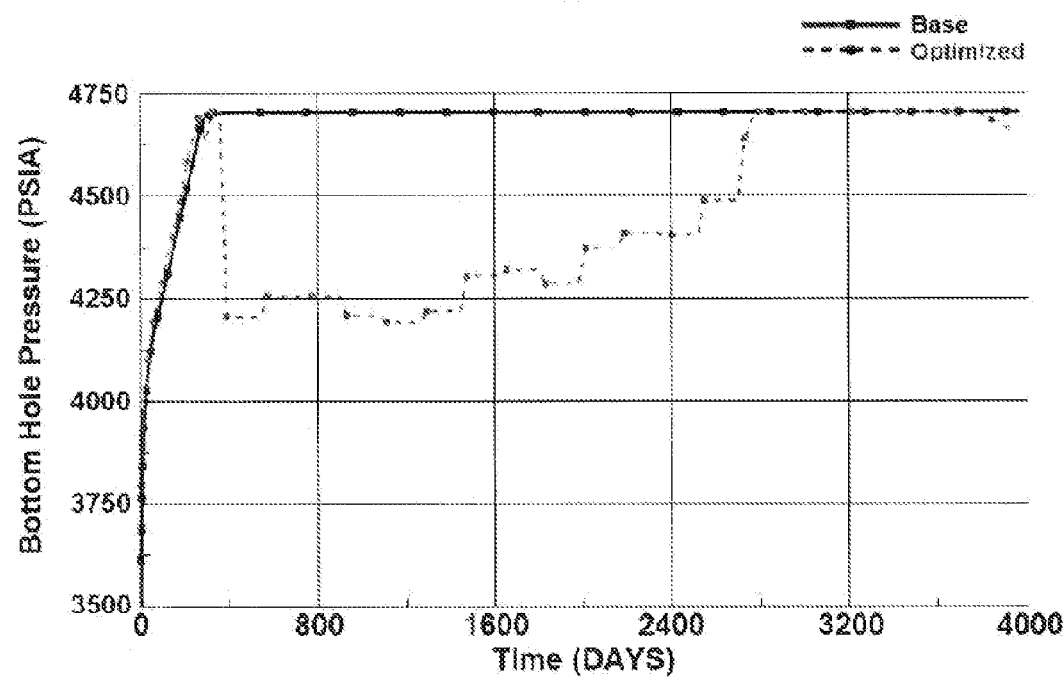

FIG. 8 shows cumulative oil production for base (solid line) and optimized (dashed line) cases. Overall, at the end of the optimization period, there was only a slight improvement in cumulative oil production. The significant increase in NPV thus was a result of a significant decrease in water injection and production as seen in FIG. 9. It can be seen that for about 500 days in the beginning, the water injection and production rates for the optimized case were similar to the base case, and after that, both injection and production decreased significantly, leading to the increase in NPV.

FIG. 10 shows BHP profiles for some of the injectors and producers for the base (solid line) and optimized (dashed line) cases. FIG. 10A shows the BHP profiles typical of most producers. Although it is hard to determine the reason behind the nature of the optimized profiles due to interaction with various constraints, it appears that the optimization is trying to open up the producers slowly over time until minimum BHP is reached. On the other hand, some wells that produce a lot of water are shut down as shown in the FIG. 10B. For most injectors, as seen in the FIG. 10C, the BHPs hit the lower bound after about 500 days, which is in agreement with the reduction in total injection. Some injectors do, however, continue injecting at the upper BHP bound throughout the optimization period as seen in the FIG. 10D.

Accordingly, the above described method, system and computer program product disclose a CPRA preconditioner, which can be used to solve the adjoint equation with transpose of the Jacobian matrix. The AMG solver can be used to solve the linear system with the transpose of pressure matrix, which is one of the two-stages of construction of the CPRA preconditioner. Example cases confirm that the CPRA combined with the AMG solver with GMRES acceleration solves the adjoint equation very efficiently with reasonable number of linear solver iterations. Adjoint simulations to calculate the gradients with the CPRA combined with the AMG solver take about the same time at most as corresponding AMG forward simulations using the conventional CPR preconditioner. Accuracy of the example case solutions has been confirmed by verifying the gradients against solutions with a direct solver. A production optimization case study for a real field using the CPRA combined with the AMG solver has further validated its accuracy, efficiency, and the capability to perform long term optimization for a large, complex reservoir models at low computational cost.

Many modifications and variations of this invention can be made without departing from its spirit and scope, as will be apparent to those skilled in the art. The specific examples described herein are offered by way of example only, and the invention is to be limited only by the terms of the appended claims, along with the full scope of equivalents to which such claims are entitled.

As used in this specification and the following claims, the terms "comprise" (as well as forms, derivatives, or variations thereof, such as "comprising" and "comprises") and "include" (as well as forms, derivatives, or variations thereof, such as "including" and "includes") are inclusive (i.e., open-ended) and do not exclude additional elements or steps. Accordingly, these terms are intended to not only cover the recited element(s) or step(s), but may also include other elements or steps not expressly recited. Furthermore, as used herein, the use of the terms "a" or "an" when used in conjunction with an element may mean "one," but it is also consistent with the meaning of "one or more," "at least one," and "one or more than one." Therefore, an element preceded by "a" or "an" does not, without more constraints, preclude the existence of additional identical elements.

NOMENCLATURE c: non linear constraint equation
C: pressure prolongation matrix
g: reservoir simulation equation
J: cost function
$J_A$: augmented cost function
$\bar{J}$: Jacobian matrix
L: Lagrangian
LB: lower bound
$M_{CPR}^{-1}$: CPR preconditioning matrix for matrix $\tilde{A}$
$M_{CPRA}^{-1}$: CPRA preconditioning matrix for matrix $(\tilde{A})^T$
$\hat{M}$: approximate factorization of matrix $\tilde{A}$
$\hat{M}$: approximate factorization of matrix $(\tilde{A})^T$
n: control step
$n_{cell}$: number of cells
$n_{eqn}$: number of equations per cell
N: total number of control steps or matrix used for pressure reduction
r: residual vector
u: control vector
UB: upper bound
x: dynamic states of the system
φ: function of the dynamic states of the last control step
λ: Lagrange multiplier
Superscript T: transpose
Subscripts p: pressure; s: unknowns excluding pressure

What is claimed is:

1. A computer-implemented method for solving adjoint models, the method comprising:
   (a) Providing, to a computer, a linear system of fluid flow equations comprising a plurality of variables that represent fluid flow properties in a geological formation of a subterranean reservoir;
   (b) constructing a matrix $(\tilde{A})^T$, through the computer, comprising a transpose of a Jacobian matrix, the transpose of the Jacobian matrix being associated with the linear system of fluid flow equations;
(c) constructing a constrained pressure residual preconditioner $M_{CPRA}^{-1}$, through the computer, responsive to the matrix $(\tilde{A})^T$ wherein $M_{CPRA}^{-1}$ is a two-stage preconditioner constructed as:

$$M_{CPRA}^{-1} = C(A_p^T)^{-1}C^T[I-(\tilde{A})^T(\hat{M})^{-1}]+(\hat{M})^{-1}; \text{ and}$$

(d) solving, through the computer, matrix equation $(\tilde{A})^T y = d$ using the constrained pressure residual preconditioner $M_{CPRA}^{-1}$.

2. The method of claim 1, wherein the linear system of fluid flow equations provided in step (a) are written in the form of matrix $\tilde{A}$ such that matrix $\tilde{A}$ corresponds to matrix equation $\tilde{A}x = \tilde{b}$ wherein solution vector X models fluid flow in the reservoir and vector $\tilde{b}$ represents of a right hand side vector of known values.

3. The method of claim 1, wherein the linear system of fluid flow equations provided in step (a) are provided at convergence for each timestep from a fully implicit reservoir simulator.

4. The method of claim 1, wherein an Algebraic Multi Grid linear solver is used for solving the matrix equation $(\tilde{A})^T y = d$ using the constrained pressure residual preconditioner $M_{CPRA}^{-1}$.

5. The method of claim 1, wherein Generalized Minimal Residual acceleration is used for solving the matrix equation $(\tilde{A})^T y = d$ using the constrained pressure residual preconditioner $M_{CPRA}^{-1}$.

6. The method of claim 1, wherein solving matrix equation $(\tilde{A})^T y = d$ using the constrained pressure residual preconditioner $M_{CPRA}^{-1}$ comprises:
(i) solving $\hat{M}x_f = r$ for $x_f$ to obtain a residual;
(ii) computing a modified residual according to $r_m = r - (\tilde{A})^T x_f$;
(iii) computing a reduced residual according to $r_p = C^T r_m$;
(iv) solving a transpose of a pressure matrix equation $$(A_p)^T x_p = r_p \text{ for } x_p; \text{ and}$$

(v) computing a true residual according to $r_t = C x_p + x_f$.

7. The method of claim 1, wherein the solution to the matrix equation $(\tilde{A})^T y = d$ is used to solve a production optimization problem.

8. The method of claim 1, wherein the solution to the matrix equation $(\tilde{A})^T y = d$ is used to solve a history-matching problem.

9. The method of claim 1, wherein the solution to the matrix equation $(\tilde{A})^T y = d$ is used to adjust a well parameter in a reservoir field.

10. A system for solving adjoint models, the system comprising:
a database configured to store data comprising a linear system of fluid flow equations comprising a plurality of variables that represent fluid flow properties in a geological formation of a subterranean reservoir;
a computer processor; and
a computer program executable on the computer processer, the computer program comprising a CPRA module configured to:

receive the linear system of fluid flow equations from the database;
construct a matrix $(\tilde{A})^T$ comprising a transpose of a Jacobian matrix, the transpose of the Jacobian matrix being associated with the linear system of fluid flow equations; and
construct a constrained pressure residual preconditioner $M_{CPRA}^{-1}$ responsive to the matrix $(\tilde{A})^T$, wherein the constrained pressure residual preconditioner $M_{CPRA}^{-1}$ is a two-stage preconditioner constructed as:

$$M_{CPRA}^{-1} = C(A_p^T)^{-1}C^T[I-(\tilde{A})^T(\hat{M})^{-1}]+(\hat{M})^{-1}.$$

11. The system of claim 10, further comprising a linear solver in communication with the CPRA module; wherein the linear solver uses the constrained pressure residual preconditioner $M_{CPRA}^{-1}$ to solve the matrix equation $(\tilde{A})^T y = d$.

12. The system of claim 10, further comprising a linear solver in communication with the CPRA module such that the linear solver uses the constrained pressure residual preconditioner $M_{CPRA}^{-1}$ to solve the matrix equation $(\tilde{A})^T y = d$ by:
solving $\hat{M}x_f = r$ for $x_f$ to obtain a residual;
computing a modified residual according to $r_m = r - (\tilde{A})^T x_f$;
computing a reduced residual according to $r_p = C^T r_m$;
solving a transpose of a pressure matrix equation $(A_p)^T x_p = r_p$ for $x_p$; and
computing a true residual according to $r_t = C x_p + x_f$.

13. The system of claim 10, further comprising a linear solver in communication with the CPRA module; wherein the linear solver uses the constrained pressure residual preconditioner $M_{CPRA}^{-1}$ to solve the matrix equation $(\tilde{A})^T y = d$ by:
applying factorization to matrix $(\tilde{A})^T$ to obtain a residual; and
using the residual to solve a transpose of a pressure matrix.

14. The system of claim 10, wherein the system further comprises a display that communicates with the CPRA module such that the solution to the matrix equation $(\tilde{A})^T y = d$ is transformed into image representations that are output to the display.

15. A computer program product, comprising a non-transitory computer usable medium having a computer readable program code embodied therein, the computer readable program code comprising:
a CPRA module configured to:
construct a matrix $(\tilde{A})^T$ comprising a transpose of a Jacobian matrix, the transpose of the Jacobian matrix being associated with a linear system of fluid flow equations comprising a plurality of variables that represent fluid flow properties in a geological formation of a subterranean reservoir; and
construct a constrained pressure residual preconditioner $M_{CPRA}^{-1}$ responsive to the matrix $(\tilde{A})^T$, wherein the constrained pressure residual preconditioner $M_{CPRA}^{-1}$ is a two-stage preconditioner constructed as:

$$M_{CPRA}^{-1} = C(A_p^T)^{-1}C^T[I-(\tilde{A})^T(\hat{M})^{-1}]+(\hat{M})^{-1}.$$

\* \* \* \* \*